US011150468B1

(12) United States Patent
Lee et al.

(10) Patent No.: US 11,150,468 B1
(45) Date of Patent: Oct. 19, 2021

(54) OPTICAL DEVICE HAVING REDUCED DIFFRACTION ARTIFACTS FOR EYE-TRACKING

(71) Applicant: Facebook Technologies, LLC, Menlo Park, CA (US)

(72) Inventors: Yun-Han Lee, Menlo Park, CA (US); Lu Lu, Menlo Park, CA (US); Mengfei Wang, Menlo Park, CA (US); Fenglin Peng, Menlo Park, CA (US); Junren Wang, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 152 days.

(21) Appl. No.: 16/535,023

(22) Filed: Aug. 7, 2019

(51) Int. Cl.
*G02B 27/00* (2006.01)
*G02B 27/01* (2006.01)
*G03H 1/02* (2006.01)
*G02B 5/32* (2006.01)

(52) U.S. Cl.
CPC .......... *G02B 27/0037* (2013.01); *G02B 5/32* (2013.01); *G02B 27/0172* (2013.01); *G02B 27/0179* (2013.01); *G03H 1/0248* (2013.01); *G02B 2027/0109* (2013.01); *G02B 2027/0116* (2013.01); *G02B 2027/0174* (2013.01); *G02B 2027/0178* (2013.01); *G02B 2027/0187* (2013.01); *G03H 2001/0264* (2013.01)

(58) Field of Classification Search
CPC .......... G02B 27/0037; G02B 27/0172; G02B 27/0179; G02B 5/32; G02B 2027/0109; G02B 2027/0116; G02B 2027/0174; G02B 2027/0178; G02B 2027/0187; G03H 1/0248; G03H 2001/0264
See application file for complete search history.

(56) References Cited

U.S. PATENT DOCUMENTS

| | | | |
|---|---|---|---|
| 6,621,607 B1 * | 9/2003 | Odhner ............... | G02B 5/1828 359/18 |
| 6,672,109 B1 * | 1/2004 | Hiraiwa ................. | C03B 19/14 501/905 |
| 6,769,273 B1 * | 8/2004 | Nakagawa .......... | C03B 19/1469 65/378 |
| 10,600,352 B1 * | 3/2020 | Wheelwright ..... | G02B 27/0172 |
| 10,634,907 B1 * | 4/2020 | Geng .................. | G02B 27/283 |
| 10,725,302 B1 * | 7/2020 | Sharma ................ | G06F 3/0346 |
| 10,725,304 B1 * | 7/2020 | Ratnam .................. | G06F 3/013 |
| 10,838,132 B1 * | 11/2020 | Calafiore ............. | G02B 6/0036 |
| 10,852,817 B1 * | 12/2020 | Ouderkirk .......... | G06K 9/00597 |
| 2004/0081043 A1 * | 4/2004 | Nishiwaki ............ | G11B 7/0943 369/44.41 |

(Continued)

OTHER PUBLICATIONS

Van Nostrum et al., "Photoinduced opposite diffusion of nematic and isotropic monomers during patterned photopolymerization," Chemistry of Materials, vol. 10, No. 1, 1998, pp. 135-145 (11 pages).

*Primary Examiner* — Blake C Riddick
(74) *Attorney, Agent, or Firm* — Millburn IP PLLC

(57) ABSTRACT

An optical device and an eye-tracking system to suppress a rainbow effect are provided. The optical device includes a grating. The grating includes at least one substrate and a grating structure coupled to the at least one substrate. The grating structure is configured to diffract an infrared light beam and transmit a visible light beam with a diffraction efficiency less than a predetermined threshold.

14 Claims, 10 Drawing Sheets

(56) References Cited

U.S. PATENT DOCUMENTS

| | | | |
|---|---|---|---|
| 2006/0280106 A1* | 12/2006 | 'T Hooft | G11B 7/14 369/275.1 |
| 2013/0077049 A1* | 3/2013 | Bohn | G02B 27/017 351/210 |
| 2016/0085300 A1* | 3/2016 | Robbins | G02B 27/0093 345/633 |
| 2019/0041634 A1* | 2/2019 | Popovich | G01S 17/66 |
| 2019/0317261 A1* | 10/2019 | Dimov | G02B 27/0172 |
| 2019/0353906 A1* | 11/2019 | Collier | G02B 27/144 |
| 2020/0043391 A1* | 2/2020 | Maimone | G02B 27/0172 |
| 2020/0050031 A1* | 2/2020 | Lu | G02F 1/0322 |
| 2020/0064633 A1* | 2/2020 | Maimone | G06F 3/013 |
| 2020/0081398 A1 | 3/2020 | Yaroshchuk | |
| 2020/0257119 A1* | 8/2020 | Lu | G02F 1/13452 |
| 2020/0271936 A1* | 8/2020 | Leibovici | G02B 27/4272 |
| 2020/0355862 A1* | 11/2020 | Lane | G03H 1/0252 |
| 2020/0356049 A1* | 11/2020 | Lane | C08L 33/18 |
| 2020/0356050 A1* | 11/2020 | Lane | G02B 27/4205 |
| 2020/0371282 A1* | 11/2020 | Geng | G02B 6/0068 |
| 2020/0371370 A1* | 11/2020 | Ouderkirk | G02B 27/283 |
| 2020/0371389 A1* | 11/2020 | Geng | G02B 27/145 |
| 2020/0371474 A1* | 11/2020 | Ouderkirk | G02B 27/4261 |
| 2020/0371475 A1* | 11/2020 | Ouderkirk | G03H 1/0493 |
| 2020/0393690 A1* | 12/2020 | Lee | H04N 5/2256 |
| 2021/0011284 A1* | 1/2021 | Andreev | G02B 27/0179 |
| 2021/0011290 A1* | 1/2021 | Maimone | G09G 3/001 |
| 2021/0011303 A1* | 1/2021 | Andreev | G02B 27/0977 |
| 2021/0041948 A1* | 2/2021 | Berkner-Cieslicki | G02B 27/0093 |

\* cited by examiner

OPTICAL DEVICE HAVING REDUCED DIFFRACTION ARTIFACTS FOR EYE-TRACKING

BACKGROUND

Near-eye displays (NEDs) have been widely used in a variety of applications, such as video playback, gaming, and sports. NEDs have been used to realize virtual reality (VR), augmented reality (AR) or mixed reality (MR). Some VR, AR or MR applications require an eye tracking function that monitors the eyes of a user and/or the region surrounding the eyes of a user. By monitoring the eyes and/or the surrounding region, the NED can determine a gaze direction of the user, which can be used for improving display quality, performance, and/or user experience, and can be used to address vergence/accommodation conflict. Further, by monitoring the eyes and/or the surrounding region, the NED can estimate the psychological state and/or changes in the psychological state of the user, as well as physical characteristics of the user. However, diffractive structures presented in an eye-tracking device, such as an eye-tracking combiner, may diffract visible light coming from a real world causing a multicolored glare in a see-through view especially when the NED is for AR or MR applications. Such a see-through artifact is often called as a "rainbow effect", which may degrade the image quality of the see-through view. To suppress the rainbow effect, conventional dimming elements have been used to dim a real-world light that is incident onto right-eye and left-eye display windows at different incidence angles, thereby dimming the undesired rainbow. However, the brightness of the desired see-through image may be reduced simultaneously.

BRIEF SUMMARY OF THE DISCLOSURE

One aspect of the present disclosure provides an optical system. The grating includes at least one substrate and a grating structure coupled to the at least one substrate. The grating structure is configured to diffract an infrared light beam and transmit a visible light beam with a diffraction efficiency less than a predetermined threshold.

Another aspect of the present disclosure provides an eye-tracking system. The eye-tracking system includes a light source configured to emit a light to illuminate an eye of a user. The eye-tracking system includes a grating disposed facing the eye and including at least one substrate and a grating structure coupled to the at least one substrate. The grating structure is configured to diffract an infrared light beam and transmit a visible light beam with a diffraction efficiency less than a predetermined threshold. The eye-tracking system includes an optical sensor configured to receive the diffracted infrared light beam, and generate an image of the eye based on the diffracted infrared light beam.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1A:
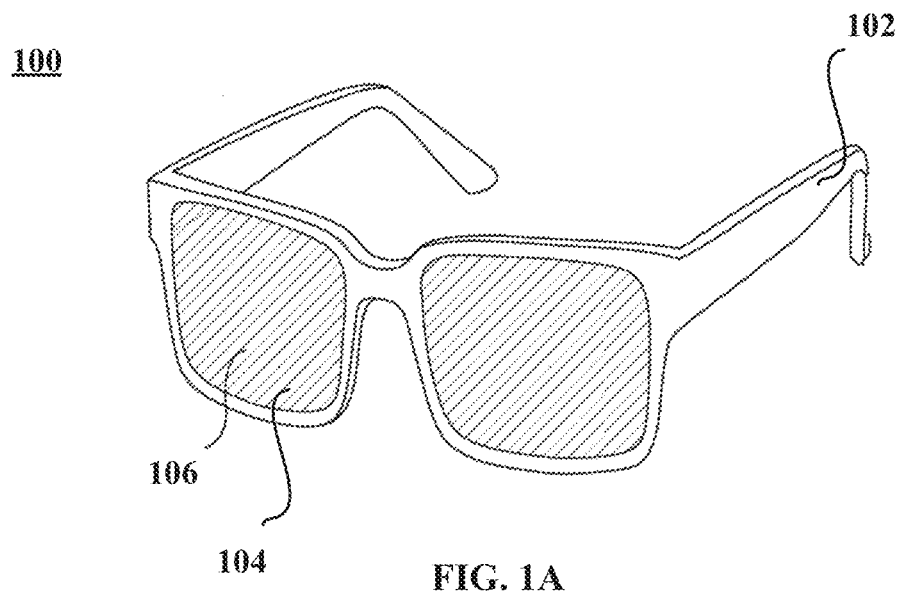
FIG. 1A illustrates a schematic diagram of a near-eye display (NED), according to an embodiment of the disclosure.

Hereinafter, embodiments consistent with the disclosure will be described with reference to drawings, which are merely examples for illustrative purposes and are not intended to limit the scope of the disclosure. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. The described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides an optical system and an eye-tracking system capable of suppressing the rainbow effect in a see-through view. The optical device may include a grating. The grating may include at least one substrate and a grating structure coupled to the at least one substrate. The grating structure may be configured to diffract an infrared light beam and transmit a visible light beam with a diffraction efficiency less than a predetermined threshold, for example, 0.5%, 0.1%, 0.05% or 0.01%. In some embodiments, the grating may include a polarization volume hologram (PVH) film. In some embodiments, PVH film may be configured to have a uniform birefringence lower than or equal to a predetermined number, for example, 0.1. In some embodiments, the PVH film may be configured to have a birefringence gradient along a thickness direction of the PVH film. Along the thickness direction of the PVH film, a birefringence of the PVH film may decreases from a predetermined portion (e.g., a center portion) to both end portions of the PVH film. In some embodiments, the PVH film may be fabricated by a liquid crystalline polymer with a photo-cross-linkable mesogenic side group. The birefringence gradient along the thickness direction of the PVH film may be attainable by varying an exposure energy at different portions of a film of the liquid crystalline polymer.

The present disclosure provides an eye-tracking system including the abovementioned optical device. The eye-tracking system may include a light source configured to emit a light to illuminate an eye of a user. The eye-tracking system may include a grating disposed facing the eye and including at least one substrate and a grating structure coupled to the at least one substrate. The grating structure may be configured to diffract an infrared light and transmit a visible light with a diffraction efficiency less than a predetermined threshold. The eye-tracking system may include an optical sensor configured to receive the diffracted infrared light, and generate an image of the eye based on the diffracted infrared light.

Figure 1B:
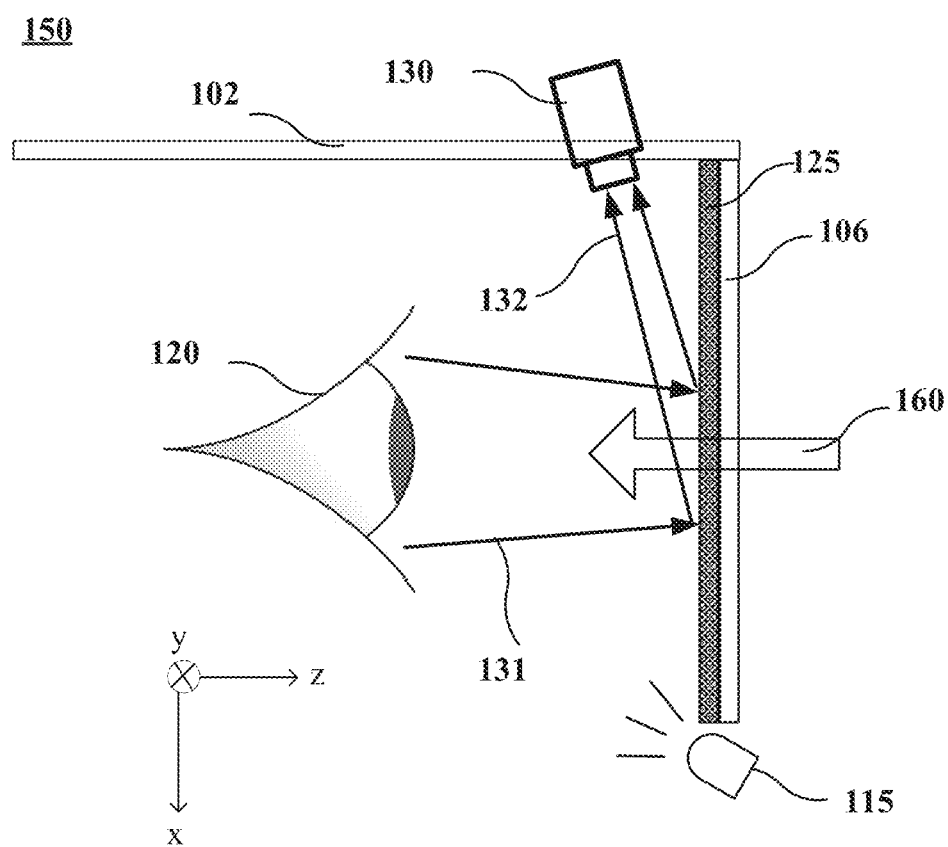
FIG. 1B illustrates a cross-sectional view of the NED in FIG. 1A, according to an embodiment of the disclosure.

FIG. 1A illustrates a schematic diagram of a near-eye display (NED) 100 according to an embodiment of the disclosure, and FIG. 1B is a cross-section 150 of the NED 100 shown in FIG. 1A according to an embodiment of the disclosure. As shown in FIG. 1A, the NED 100 may include a frame 102 configured to rest on a user's head, right-eye and left-eye display systems 104 mounted to the frame 102, and an eye-tracking system (not shown in FIG. 1A). Each of the right-eye and left-eye display systems 104 may include image display componentry configured to project computer-generated virtual images into right and left display windows 106 in the user's field of view (FOV). The NED 100 may function as a virtual reality (VR) device, an augmented reality (AR) device, or a mixed reality (MR) device, or any combination thereof. In some embodiments, when the NED 100 functions as an AR or a MR device, the right and left display windows 106 may be entirely or partially transparent from the perspective of the user, to give the user a view of a surrounding real-world environment. In some embodiments, when the NED 100 functions as a VR device, the right and left display windows 106 may be opaque, such that the user may be completely absorbed in the VR imagery provided via the NED. In some embodiments, the NED 100 may further include a dimming element, which may dynamically adjust the transmittance of real-world objects viewed through the right and left display windows 106, thereby switching the NED 100 between a VR device and an AR device or between a VR device and a MR device. In some embodiments, along with switching between the AR/MR device and the VR device, the dimming element may be used in the AR device to mitigate difference in brightness of real and virtual objects.

As shown in FIG. 1B, the eye-tracking system may be an optical system configured to provide eye-tracking information by utilizing light emitted or reflected by a user's eye being tracked. It is understood that such an optical system may be used to track a target other than an eye of a user. In some embodiments, the eye-tracking system may include a light source 115 configured to emit a light to illuminate one or two eyes 120 of a user. The light source 115 may be positioned out of a line of sight of the user and below the eye 120. FIG. 1B shows one eye 120 for illustrative purposes. It is understood that components for tracking the eye 120 may be replicated for tracking the other eye of the user, which are omitted in FIG. 1B.

In some embodiments, the light emitted by the light source 115 may include a narrow spectrum or a relatively broad spectrum, and one or more wavelengths of the light may be in the infrared (IR) spectrum, i.e., the spectrum of the light source 115 may be within, overlap, or encompass the IR spectrum. In some embodiments, the light source 115 may emit light in the near infrared (NIR) band (about 750 nm to 1250 nm), or some other portion of the electromagnetic spectrum. NIR spectrum light may be advantageous in some embodiments because the NIR spectrum light is not visible to the human eye and thus, does not distract the user wearing the NED during operation. The infrared light may be reflected by a pupil area, of the eye 120, the entire eye 120 of the user, an area near, such as above, below, left to, or right to, the eye 120 of the user, or an area including the eye 120 and the area near the eye 120.

The eye-tracking system may include a grating 125 configured to guide the light reflected by the eye 120 towards an optical sensor 130. The optical sensor 130 may be arranged relative to the grating 125, thereby receiving the light guided by the grating 125 and generating a signal for eye-tracking. For example, an image of the eye 120 may be generated based on the eye-tracking signal. The optical sensor 130 may be sensible to light having a wavelength within a spectrum that includes IR spectrum. In some embodiments, the optical sensor 130 may be sensible to IR light but not visible light. In some embodiments, the optical sensor 130 may include a camera, such as a charge-coupled device (CCD) camera, a complementary metal-oxide-semiconductor (CMOS) sensor, an N-type metal-oxide-semiconductor (NMOS) sensor, a pixelated camera, or any other suitable cameras.

In some embodiments, the optical sensor 130 may be mounted at any suitable part of the eye-tracking system, as long as the optical sensor 130 may be arranged to face the grating 125 to receive reflected light guided by the grating 125. In some embodiments, the optical sensor 130 may be mounted on the frame 102 of the NED 100. Further, the optical sensor 130 may include a processor configured to process the received IR light, to generate an image of the eye 120, and/or to analyze the image of the eye 120 to obtain information that may be used for eye-tracking and other subsequent operations, such as for determining what information to present to the user or the layout of the presentation of the information, etc. In some embodiments, the optical sensor 130 may also include a non-transitory computer-readable storage medium (e.g., a computer-readable memory) configured to store data, such as the generated images. In some embodiments, the non-transitory computer-readable storage medium may store codes or instructions that may be executable by the processor to perform various steps of any method disclosed herein. In some embodiments, the processor and the non-transitory computer-readable medium may be provided separately from the optical sensor 130. For example, the eye-tracking system may include a controller communicatively connected with the optical sensor 130 and configured to receive data from the optical sensor 130. The controller may be configured to analyze the data (e.g., images of the eye 120) received from the optical sensor 130 to obtain information for eye-tracking or other purposes.

The grating 125 may be configured to diffract an IR light 131 reflected by the eye 120 (referred to as reflected light in the following) towards the optical sensor 130. The reflected IR light 131 may be incident onto the grating 125 with various incidence angles, such as 0 degree (i.e., perpendicular to the surface of the grating 125), 30 degrees, 45 degrees, 60 degrees, 70 degrees, etc., then diffracted by the grating 125 to a diffracted IR light 132 when the Bragg condition is satisfied. The optical sensor 130 may be positioned to receive the diffracted IR light 132, and generate an image of the eye 120 based on the diffracted light IR 132. The grating 125 may also be configured to transmit a visible light 160 from a real world towards the eye 120, such that the eye 120 of the user may see a virtual object (generated by the right-eye and left-eye display systems 104 in FIG. 1A) optically combined with a view of real-world objects, achieving an optical see-though AR or MR device. In some embodiments, the grating 125 is also referred to as an eye-tracking combiner, which on one hand diffracts the IR light 131 reflected by the eye 120 towards the optical sensor 130, and on the other hand superimposes the direct view of the real world and computer-generated images.

As discussed in the background, an eye-tracking combiner may diffract visible light coming from a real world due to the diffractive structures, causing a rainbow effect in a see-through view especially when the user wearing the NED looks at a bright light source from certain angles. Such see-through artifacts may degrade the image quality of the see-through view. In view of this, the present discourse provides a grating configured to diffract the IR light 131 reflected from the eye 120 when the Bragg condition is satisfied and transmit the visible light 160 from a real world with negligible diffraction. A diffraction efficiency of the grating for the visible light 160 may be less than a predetermined threshold, such as 0.5%, 0.1%, 0.05% or 0.01%. Thus, the rainbow effect caused by the diffractive structures in the eye-tracking system may be observed to be significantly reduced, while the brightness of the desired see-through image may be only slightly affected.

Figure 2:
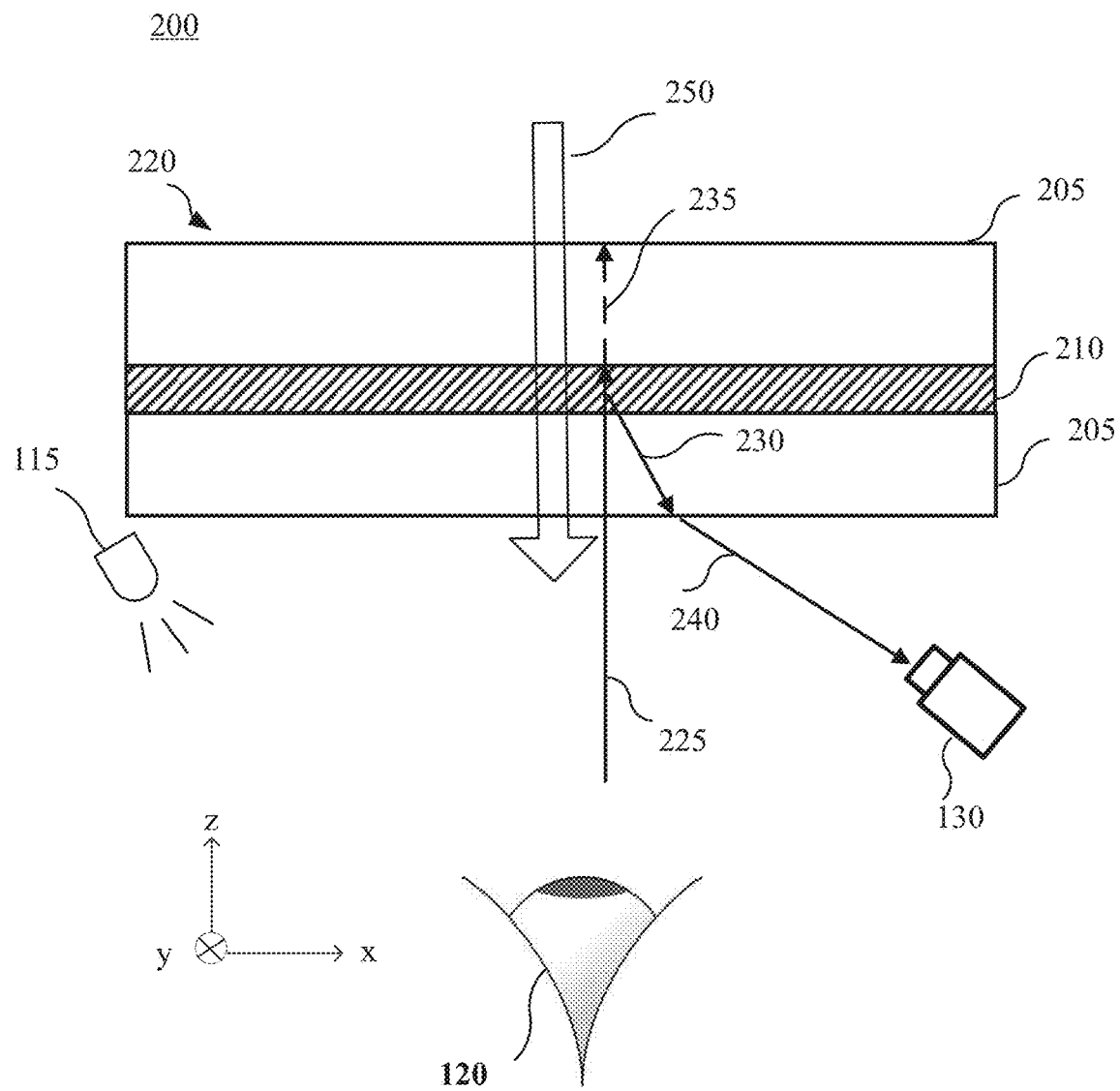
FIG. 2 illustrates a schematic diagram of an eye-tracking system, according to an embodiment of the disclosure.

FIG. 2 illustrates a schematic diagram of an eye-tracking system 200 according to an embodiment of the disclosure. The eye-tracking system 200 may be an embodiment of the eye-tracking system shown in FIG. 1B. The eye-tracking system 200 may include components similar to the eye-tracking system shown in FIG. 1B. As shown in FIG. 2, the eye-tracking system 200 may include the light source 115, the optical sensor 130 and a grating 220. The details of the light source 115 and the optical sensor 130 can be referred to the description of FIG. 1B, which are not repeated here. The grating 220 may be configured to diffract an IR light 225 reflected from the eye 120 when the Bragg condition is satisfied, and transmit a visible light 250 from a real world with a diffraction efficiency lower than a predetermined threshold. In some embodiments, the predetermined threshold may be about 0.5%. In some embodiments, the predetermined threshold may be about 0.1%. In some embodiments, the predetermined threshold may be about 0.05%. In some embodiments, the predetermined threshold may be about 0.01%. In some embodiments, the visible light 250 from the real world may be substantially normally incident onto the grating 220. In some embodiments, the visible light 250 from the real world may be incident onto the grating 220 at a variety of incidence angles.

As shown in FIG. 2, the grating 220 may include at least one substrate 205 and a plurality of grating structures 210 formed on the at least one substrate 205. The substrate 205 may provide support and protection to the grating structures 210. For illustrative purposes, FIG. 2 shows the grating 220 may include two substrate 205: a top substrate facing the real world viewed through the NED and a bottom substrate facing the eye 120. The grating structures 210 may be disposed between the top substrate 205 and bottom substrate 205. In some embodiments, the substrate 205 may include a lens or an optical waveguide made of a suitable material, such as glass, plastics, etc. The substrate 205 may be rigid or flexible. In some embodiments, the substrate 205 may also be a part of another optical device or another optoelectrical device. For example, the substrate 205 may be a part of a functional device, such as a display screen. In some embodiments, the grating structures 210 may be formed on or bonded to a surface of the substrate 205. In some embodiments, the grating structures 210 may direct contact the surface of the at least one substrate 205. In some embodiments, the grating structures 210 may be spaced apart from the substrate 205 by a spacing material. In some embodiments, additional layer(s), such as protection layer(s) and/or buffer layer(s), may be arranged between the substrate 205 and the grating structures 210.

The grating structures 210 may be any suitable grating structures. In some embodiments, the grating structures 210 may be in a form of a polarization volume hologram (PVH) film, e.g., a reflective three-dimensional (3D) volumetric PVH film. The grating structures 210 are also referred to as a PVH film, and the grating 220 is also referred to a PVH grating, a polarization sensitive grating, a polarization sensitive optical element, or a chiral liquid crystal (LC) element. The PVH film 210 may be a birefringent material film that includes a plurality of birefringent material molecules, for example, liquid crystal (LC) molecules, and/or reactive mesogens that are polymerizable molecules with similar optical properties to LCs. The birefringent material molecules may be spatially orientated to realize an optical function of the PVH film 210.

The PVH film 210 may be configured to diffract an incident light via Bragg diffraction. The PVH film may be categorized into a left-handed PVH film and a right-handed PVH film. For example, a left-handed PVH film may diffract a left-handed circularly polarized (LCP) light and transmit a right-handed circularly polarized (RCP) light, while a right-handed PVH film may diffract an RCP light and transmit an LCP light. Note an unpolarized light can be decomposed into an LCP light and an RCP light. In some embodiments, depending on the alignment of the birefringent molecules in the PVH film, the PVH film may further converge or diverge the incident light. Generally speaking, both reflective and transmissive PVH films (i.e., reflective and transmissive PVH gratings) can be fabricated, depending on the direction of the incident and diffracted beams. For a reflective PVH film, an incident beam and a diffracted beam may be at the same side of the PVH film. For a transmissive PVH film, an incident beam and a diffracted beam may be at the opposite sides of the PVH film. It should be noted that, a PVH film may have both transmitting orders and reflecting orders of diffracted light. In a reflective PVH film, the diffraction efficiency of the transmitting orders may be desired to be significantly suppressed as compared to the reflecting orders, while in a transmissive PVH film, the diffraction efficiency of the reflecting orders may be desired to be significantly suppressed as compared to the transmitting orders.

In the disclosed embodiments, the PVH film 210 may be configured to diffract the IR light 225 that is emitted from the light source 115 and reflected by the eye 120 when the Bragg condition is satisfied. The PVH film 210 may also be configured transmit the visible light 250 from a real world with negligible diffraction, e.g., a diffraction efficiency lower than a predetermined threshold. In some embodiments, the predetermined threshold may be about 0.5%. In some embodiments, the predetermined threshold may be about 0.1%. In some embodiments, the predetermined threshold may be about 0.05%. In some embodiments, the predetermined threshold may be about 0.01%.

For discussion purposes, the PVH film 210 may be a right-handed PVH film that diffracts an RCP light and transmits an LCP light. The IR light 225 reflected by the eye 120 towards the PVH film 210 may be a unpolarized light. The RCP portion of the unpolarized IR light 225 may be deflected by the PVH film 210 to be an RCP light 230 towards the bottom substrate 205, and the LCP portion of the unpolarized IR light 225 may be transmitted through the PVH film 210 to be an LCP light 235 towards the top substrate 205. The RCP light 230 may be refracted at an outside surface of the bottom substrate 205 to be a light 240, which is received by the optical sensor 130. An eye-tracking signal may be generated based on the received light 240.

In some embodiments, to enable the PVH film 210 to diffract the IR light 225 reflected from the eye 120 when the Bragg condition is satisfied and transmit the visible light 250 from a real world with negligible diffraction, the PVH film 210 may be configured with a birefringence (i.e., PVH birefringence $\Delta n$) smaller than or equal to a predetermined value. The PVH birefringence $\Delta n$ may be uniform across the entire PVH film 210. In some embodiments, the predetermined value of the PVH birefringence $\Delta n$ may be about 0.1. In some embodiments, the predetermined value of the PVH birefringence $\Delta n$ may be about 0.07. In some embodiments, the predetermined value of the PVH birefringence $\Delta n$ may be about 0.05.

In some embodiments, to enable the PVH film 210 to diffract the IR light 225 reflected from the eye 120 when the Bragg condition is satisfied and transmit the visible light 250 from a real world with negligible diffraction, the PVH film 210 may be configured with gradient birefringence (i.e., gradient PVH birefringence $\Delta n$) or a birefringence gradient along a thickness direction of the PVH film 210, e.g., z-axis direction in FIG. 2. In the present disclosure, the term "gradient birefringence" or "a birefringence gradient" refers to PVH birefringence $\Delta n$ that is greater at one selected portion than end portions in the thickness direction of the PVH film 210, with the PVH birefringence $\Delta n$ changing therebetween in a gradient manner. Moreover, the PVH birefringence $\Delta n$ changing from the selected portion to the end portions of the PVH film 210 may be linear or not and may be continuous or not.

In some embodiments, along the thickness direction of the PVH film 210, the PVH birefringence $\Delta n$ of the PVH film 210 may gradually decrease from a predetermined portion to both end portions of the PVH film 210. The PVH birefringence $\Delta n$ of the PVH film 210 may be a function of the height of the PVH film 210. In some embodiments, at the same height, the PVH birefringence $\Delta n$ of the PVH film 210 may be uniform in a longitudinal direction of the PVH film 210. In some embodiments, the predetermined portion may be a substantial center of the PVH film 210. In some embodiments, the predetermined portion may be different from the center of the PVH film 210.

Figure 3A:
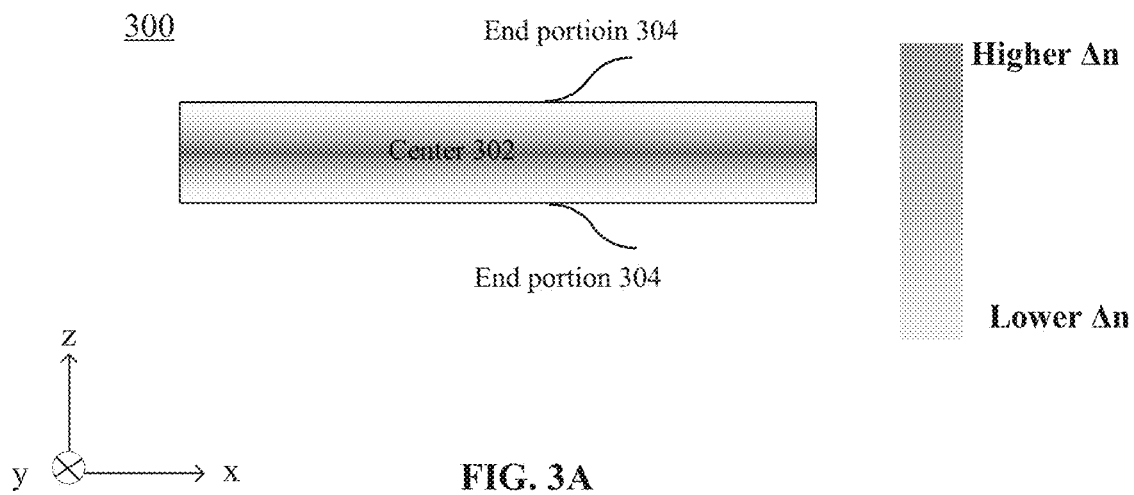
FIG. 3A illustrates a schematic diagram of a polarization volume hologram (PVH) film, according to an embodiment of the disclosure.

FIG. 3A illustrates a schematic diagram of a PVH film 300, according to an embodiment of the disclosure. The PVH film 300 may be an embodiment of the PVH film 300 in FIG. 2. As shown in FIG. 3A, the PVH film 300 may be configured with gradient birefringence along a thickness direction of the PVH film 300, e.g., z-axis direction in FIG. 3. The grey level bar indicates the PVH birefringence $\Delta n$ of the PVH film 300, where a darker color denotes a higher PVH birefringence $\Delta n$. As shown in FIG. 3A, in the thickness direction of the PVH film 300, the PVH birefringence $\Delta n$ of the PVH film 300 may gradually decrease from a substantially center position 302 to both end portions 304 of the PVH film 300. At the same height, the PVH birefringence $\Delta n$ of the PVH film 300 may be uniform across the PVH film 300 in the x-y plane. In some embodiments, the PVH birefringence $\Delta n$ of the PVH film 300 may be a function of the height of the PVH film 300.

Figure 3B:
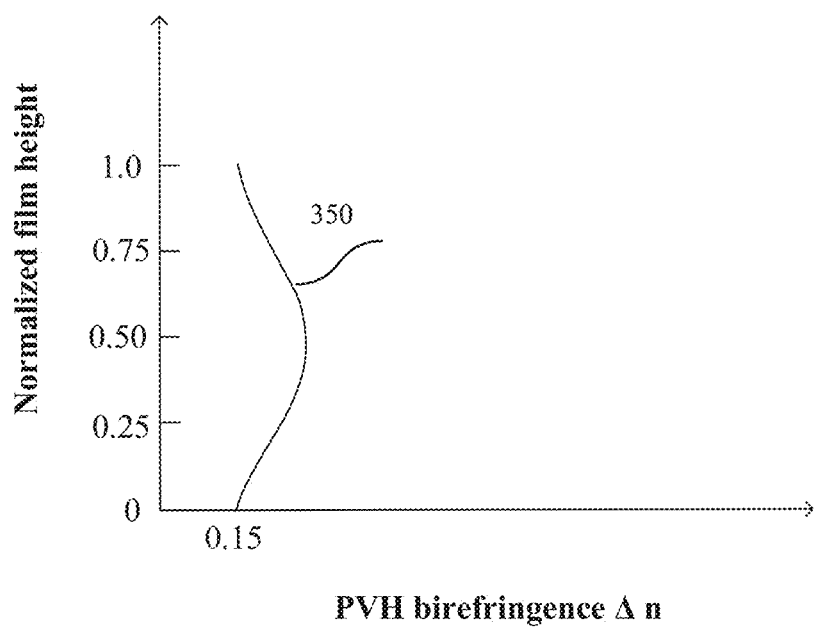
FIG. 3B illustrates a relationship between a normalized film height and PVH birefringence of the PVH film in FIG. 3A, according to an embodiment of the disclosure.

FIG. 3B illustrates a relationship between a normalized film height and PVH birefringence of the PVH film 300 in FIG. 3A, according to an embodiment of the disclosure. The horizontal axis and vertical axis represent the PVH birefringence $\Delta n$ and the normalized film height of the PVH film 300, respectively. As shown in FIG. 3B, in the thickness direction of the PVH film 300, the PVH birefringence $\Delta n$ of the PVH film 300 may gradually decrease from a substantially center position to both end portions, where the PVH film 300 has a highest birefringence $\Delta n$ of about 0.15 at the substantially center position, and a lowest birefringence $\Delta n$ of about 0.04 at both end portions. At the same height, the PVH film 300 may have a uniform birefringence across a surface perpendicular to the thickness direction of the PVH film 300. The PVH birefringence $\Delta n$ may decrease from the center to both end portions of the PVH film 300 at a same speed or different speeds, i.e., in the thickness direction of the PVH film 300, the birefringence distribution may be symmetrical or asymmetrical with respect to the center of the PVH film 300.

It should be noted that, FIG. 3B illustrates a curve 350 showing that the PVH birefringence $\Delta n$ of the PVH film 300 gradually decreases from a substantially center position to both end portions, and the curve 350 may represent a function showing a relationship between the PVH birefringence $\Delta n$ and the normalized film height. The curve 350 in FIG. 3B is for illustrative purposes, and is not intended to limit the scope of the present discourse. In some embodiments, the curve 350 (i.e., the function) showing a relationship between the PVH birefringence $\Delta n$ and the normalized film height may vary according to different application scenarios.

In some embodiments, the PVH film 300 may be fabricated by a liquid crystalline polymer with photo-cross-linkable mesogenic side groups, where a large optical anisotropy may be generated by irradiating with polarized laser (e.g., UV, violet or blue) and a subsequent heat treatment (e.g., annealing). In some embodiments, the liquid crystalline polymer with photo-cross-linkable mesogenic side groups may include liquid crystalline polymethacrylates or any other polymer having the same function. In some embodiments, the PVH film may be fabricated by a polymethacrylate with 4-(4-methoxycinnamoyloxy) biphenyl (MCB) side groups that exhibits an efficient in-plane molecular reorientation. Polymethacrylate with 4-(4-methoxycinnamoyloxy) biphenyl (MCB) side groups has a chemical formula of

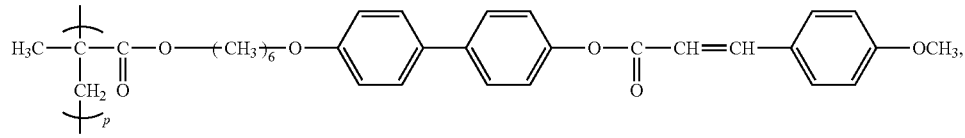

and is referred to as M1 in the following description. The irradiating with a polarized laser (e.g., UV, violet or blue) to a thin film of M1 (or a M1 film) may induce an optical anisotropy due to an axis-selective photo-cross-linking reaction, and a subsequent annealing may enhance the photoinduced optical anisotropy. The photoinduced optical anisotropy (or photoinduced birefringence) of the M1 film may be a function of exposure energy.

Figure 4:
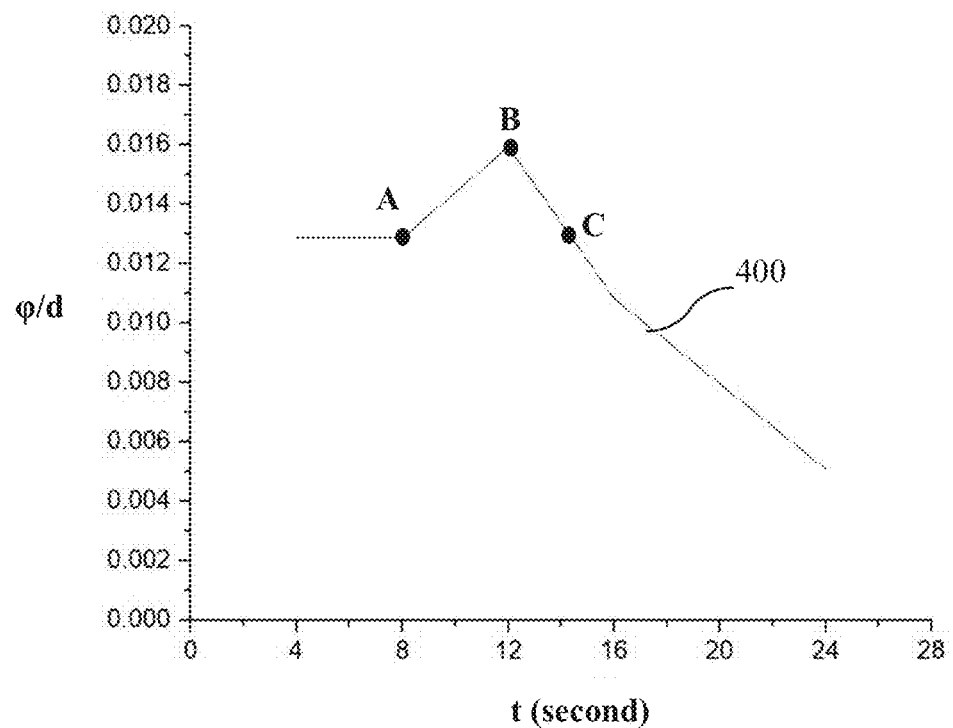
FIG. 4 illustrates a relationship between phase retardation and exposure energy of a M1 film according to an embodiment of the present discourse.

FIG. 4 illustrates exposure energy dependent retardation of a M1 film according to an embodiment of the present discourse. The M1 film may be prepared by dispensing (e.g., spin coating) a mixture of M1 and a solvent, for example, chloroform ($CHCl_3$), on a substrate to form a spin-coated film, irradiating a linearly polarized laser (e.g., UV, violet or blue) on the spin-coated film to induce an optical anisotropy, and heat treating (e.g., annealing) the irradiated film to enhance the photoinduced optical anisotropy. The concentration of M1 in the mixture of M1 and chloroform ($CHCl_3$) is about 1.7%, the spinning coating lasts for about 10 s at 1000 rpm, and the spin-coated film of M1 has a thickness of about 50 nm. The linearly polarized laser has a wavelength of about 325 nm, and the exposure intensity is about 40 $mW/cm^2$. The annealing of the film after interference exposure lasts for about 10 mins at a temperature of about 180° C.

As shown in FIG. 4, the horizontal and vertical axes represent the exposure time t (unit: second) and the retardation per micron $\varphi/d$, respectively. The retardation of the M1 film may be related to the photoinduced birefringence $\Delta n_p$ and the thickness d of the M1 film by the following formula: $\varphi = 2\pi * \Delta n_p * d/\lambda_0$, where $\lambda_0$ is the vacuum wavelength of the light. The retardation per micron is $\varphi/d = 2\pi * \Delta n_p/\lambda_0$. Under a given vacuum wavelength $\lambda_0$ of the incident light, the retardation per micron $\varphi/d$ may be proportional to the photoinduced birefringence $\Delta n_p$ of the M1 film. The exposure energy (unit: $mJ/cm^2$) received by the M1 film may be related to the exposure time (unit: second) and exposure intensity (unit: $mW/cm^2$). Under given exposure intensity, the exposure energy received by the M1 film may be proportional to the exposure time. Under given exposure time, the exposure energy received by the M1 film may be proportional to the exposure intensity.

As indicated by a curve 400 showing exposure energy dependent retardation of the M1 film, the M1 film does not exhibit an obvious retardation until the exposure has been going on for about 4 seconds. That is, the optical anisotropy is not induced to the M1 film at the first 4 seconds of the exposure. As the exposure time gradually increases from 4 seconds to 8 seconds, the M1 film exhibits a substantially constant retardation with about 0.013 retardation per micron $\varphi/d$. That is, the photoinduced optical anisotropy (or photoinduced birefringence $\Delta n_p$) of the M1 film is substantially constant as the exposure time goes from t=4 s to t=8 s. When the exposure keeps going on, the retardation per micron $\varphi/d$ of the M1 film linearly increases to a peak of about 0.016 at t=12 s, then linearly decreases in a relatively fast speed to about 0.011 at t=15 s, and linearly decreases in a relatively slow speed to about 0.005 at t=24 s. That is, as the exposure time keeps increasing, the photoinduced birefringence $\Delta n_p$ of the M1 film gradually increases to a maximum value at t=12 s then gradually decreases.

FIG. 4 shows that the photoinduced birefringence $\Delta n_p$ of the M1 film is dependent on the exposure time when the exposure intensity is constant across the M1 film. Thus, a gradient in the photoinduced birefringence $\Delta n_p$ in the thickens direction of the M1 film may be attainable by varying the exposure time at different portions of the M1 film. One skilled in the art can further understand that when the exposure time is the same at different portions of the M1 film, a gradient in the photoinduced birefringence $\Delta n_p$ in the thickens direction of the M1 film may be attainable by varying the exposure intensity at different portions of the M1 film. That is, a gradient in the photoinduced birefringence $\Delta n_p$ in the thickens direction of the M1 film may be attainable by varying the exposure time and/or exposure intensity in the thickens direction of the M1 film.

Figure 5:
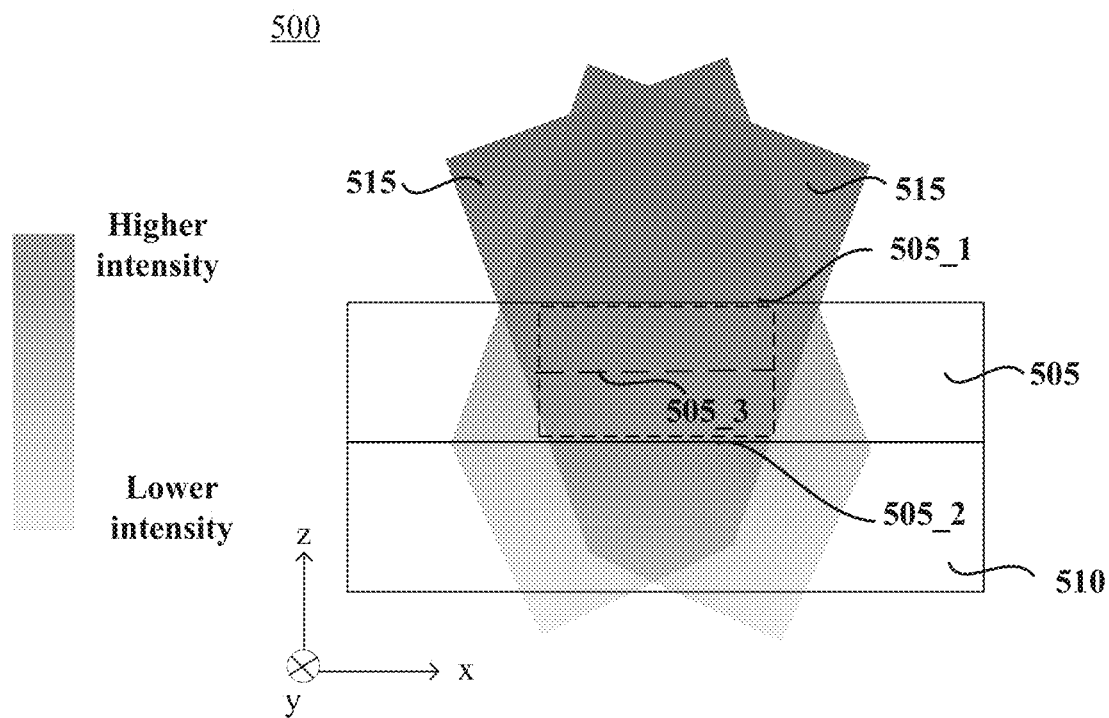
FIG. 5 illustrates an interference exposure of a M1 film to obtain a PVH film having a photoinduced birefringence gradient, according to an embodiment of the present discourse.

FIG. 5 illustrates an interference exposure 500 of a M1 film to obtain a 3D volumetric PVH film having a birefringence gradient in the thickness direction, according to an embodiment of the present discourse. A gradient in the photoinduced birefringence $\Delta n_p$ in the thickness direction of the PVH film may be attainable by varying the exposure intensity in the thickens direction of the M1 film. As shown in FIG. 5, a mixture of mixture of M1 and a solvent (e.g., chloroform ($CHCl_3$)) may be dispensed (e.g., spin coated) on a substrate 510 to form a M1 film 505. Two polarized beams 515, e.g., opposite-handed circularly polarized beams, may be aligned in an angle α to generate an interference pattern (e.g., distributed in a dashed square in FIG. 5B) that is to be recorded on the M1 film 505. The grey level bar indicates the light intensity of the beam 515, where a darker color denotes a higher light intensity. The exposed M1 film may be heat treated (e.g., annealed) at an elevated temperature. In some embodiments, the abovementioned process may be repeated until a PVH film with a sufficient thickness is obtained. For example, a second M1 film may be dispensed on the annealed M1 film, exposed to the interference exposure, and heat treated (e.g., annealed) at the elevated temperature to form a second annealed M1 film. Such a process may be repeated until a PVH film with a sufficient thickness is obtained.

The interference pattern generated by the two polarized beams 515 may have an intensity gradient along a thickness direction of the M1 film 505, e.g., z-axis in FIG. 5. In some embodiments, along with the beam propagation of the two polarized beams 515 inside the M1 film 505, the beam intensity may gradually decrease due to the beam attenuation, e.g., absorption, reflection, and/or scattering, etc. Thus, the intensity of the interference pattern generated by the polarized beams 515 may gradually decrease as the two polarized beams 515 propagates inside the M1 film 505. For example, in the thickness direction of the M1 film 505, the beam intensity of the polarized beams 515 may gradually decease from a beam incident surface 505_1 of the M1 film 505 to a beam exiting surface 505_2 of the M1 film 505. Thus, in the thickness direction of the M1 film 505, the intensity of the interference pattern generated by the polarized beams 515 may gradually decrease from the beam incident surface 505_1 of the M1 film 505 to the beam exiting surface 505_2 of the M1 film 505. At the same height of the M1 film 505, the intensity of the interference pattern generated by the polarized beams 515 may be uniform across a surface perpendicular to the thickness direction of the M1 film 505.

Through configuring an appropriate exposure intensity gradient along the thickness direction of the M1 film 505, the photoinduced birefringence $\Delta n_p$ in the exposed M1 film may gradually decrease from a predetermined direction (e.g., a center position) to both end portions in the thickness direction of the M1 film. For example, referring to FIG. 4, the exposure intensity gradient along the thickness direction of the M1 film 505, three points A, B and C are selected from the curve 400 showing the relationship between the exposure energy and the film retardation. The points A, B and C may correspond to an exposure time of 8 s, 12 s and 14 s, respectively, and the exposure intensity may be uniform. Because the exposure energy $\psi$=time (t)*exposure intensity ($\varphi$), the points A, B and C may correspond to an exposure energy of 8$\varphi$, 12$\varphi$ and 14$\varphi$, respectively. Among the three points A, B and C, the points A and C correspond to the highest exposure energy and the lowest exposure energy, respectively, but the points A and C correspond to the same value of retardation per micron (about 0.013), i.e., the same photoinduced birefringence $\Delta n_p$. The point B corresponds to a medium exposure energy but the largest value of retardation per micron (about 0.016), i.e., the largest photoinduced birefringence $\Delta n_p$. The curve 400 shows that from the point B to the point A and from the point B to the point C, the photoinduced birefringence $\Delta n_p$ may gradually decrease.

Referring to FIG. 4 and FIG. 5, to configure the photoinduced birefringence $\Delta n_p$ in the exposed M1 film to gradually decrease from a predetermined direction (e.g., a center position) to both end portions in the thickness direction of the M1 film, an upper surface (also the light incident surface) 505_1, a middle layer 505_3 and a lower surface (also the light exiting surface) 5052 of the M1 film may be configured to be subjected to an exposure energy of 14$\varphi$ (i.e., the exposure energy corresponding to the point C in FIG. 4), 12$\varphi$ (i.e., the exposure energy corresponding to the point B in FIG. 4), and 8$\varphi$ (i.e., the exposure energy corresponding to the point C in FIG. 4), respectively. It is understood that the exposure energy experienced by the upper surface 505_1, the middle layer 505_3 and the lower surface 505_2 gradually decrease, because the beam intensity may gradually decrease along with the beam propagation of the two polarized beams 515 inside the M1 film 505. Thus, the exposed M1 film may have the largest value of retardation per micron (about 0.016) at the center and the smallest retardation per micron (about 0.013) at both end portions, and the retardation per micron may gradually decrease from the center to both end portions. That is, the exposed M1 film may have the largest photoinduced birefringence $\Delta n_p$ at the center of the film and the smallest photoinduced birefringence $\Delta n_p$ at both end portions of the film, and the photoinduced birefringence $\Delta n_p$ may gradually decrease from the center to both end portions of the film.

When the exposure time ($T_p$) of the different portions of the M1 film 505 is the same, the exposure intensity experienced by the upper surface 505_1, the middle layer 505_3 and the lower surface 505_2 may be configured to be about 14$\varphi$/$T_p$, 12$\varphi$/$T_p$ and 8$\varphi$/$T_p$, respectively. The exposed M1 film may have the largest photoinduced birefringence $\Delta n_p$ at the center of the film and the smallest photoinduced birefringence $\Delta n_p$ at both end portions of the film, and the photoinduced birefringence $\Delta n_p$ may gradually decrease from the center to both end portions of the film. Such an exposure intensity gradient along the thickness direction of the M1 film 505 may be realized by, for example, adjusting the light intensity of one or two polarized beams 515, adjusting the relative position of the beams 515 and the M1 film 505, and/or adjusting the film thickness of the M1 film, etc.

Figure 6:
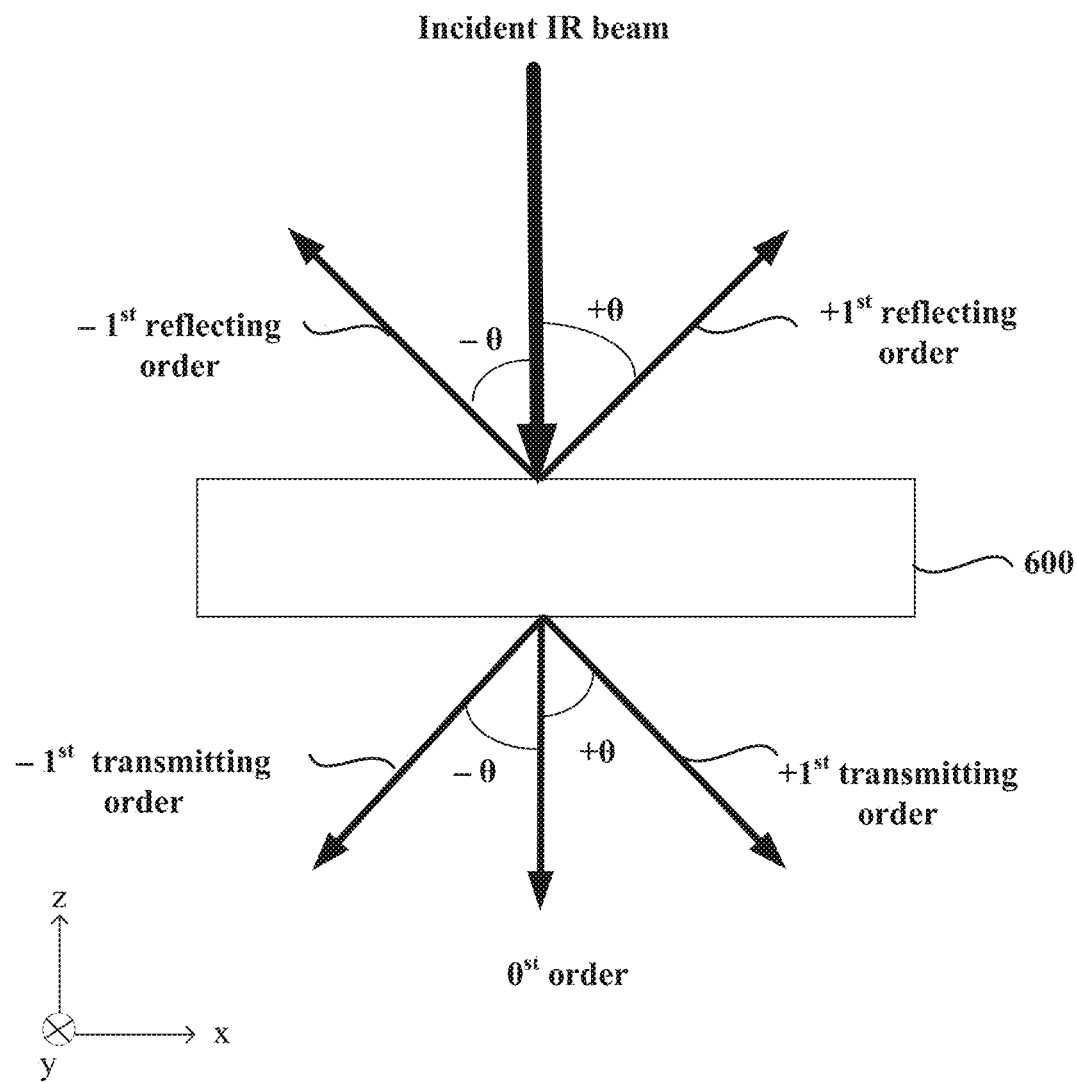
FIG. 6 illustrates diffracted light beams of a PVH film under a normally incident light.

To evaluate the capability of suppressing the rainbow effect, the diffraction efficiency of PVH films with a birefringence gradient in the thickness direction or uniform birefringence across the film are simulated and compared over the visible spectrum (about 400 nm-700 nm). FIG. 6 illustrates diffraction of a PVH film 600 under a normally incident unpolarized light. As shown in FIG. 6, when a unpolarized light is normally incident onto the PVH film 600, the diffracted light beams may include the +1$^{st}$ reflecting order, the −1$^{st}$ reflecting order, the +1$^{st}$ transmitting order, and the −1$^{st}$ reflecting order light beams. As the diffraction order increases, the diffraction efficiency may be significantly decreased and, thus, only the +1$^{st}$ reflecting order, the −1$^{st}$ reflecting order, the +1$^{st}$ transmitting order, and the −1$^{st}$ reflecting order light beams are considered. The +1$^{st}$ reflecting order and +1$^{st}$ transmitting order beams each may have a deflection angle of +θ, and the −1$^{st}$ reflecting order and −1$^{st}$ reflecting order light beams each may have a deflection angle of −θ.

FIGS. 7A-7B and FIGS. 8A-8B illustrate wavelength dependent diffraction efficiency of four reflective PVH films under a normally incident unpolarized light are simulated over the visible spectrum. The four PVH films include a first PVH film that is a PVH film having a uniform birefringence of 0.15, a second PVH film that is a PVH film having a uniform birefringence of 0.1, a third PVH film that is a PVH film having a uniform birefringence of 0.07, and a fourth PVH film that is a PVH film having a birefringence gradient of $\Delta\chi$ in the thickness direction (the center of the PVH film having birefringence of 0.15+$\Delta\chi$, and the two end portions of the PVH film having birefringence of 0.15). Each PVH film has a thickness of 3 μm. The incident light has a central wavelength of about 940 nm, and a deflection angle θ is about 650 in air. As shown in FIGS. 7A-7B and FIGS. 8A-8B, the horizontal axis and vertical axis represent the wavelength of the incident light and the diffraction efficiency, respectively. It should be noted that, the incident light having a central wavelength of about 940 nm is for illustrative purposes, in some embodiments, the central wavelength may be other wavelength in infrared spectrum from about 700 nm to 1100 nm.

Figure 7A:
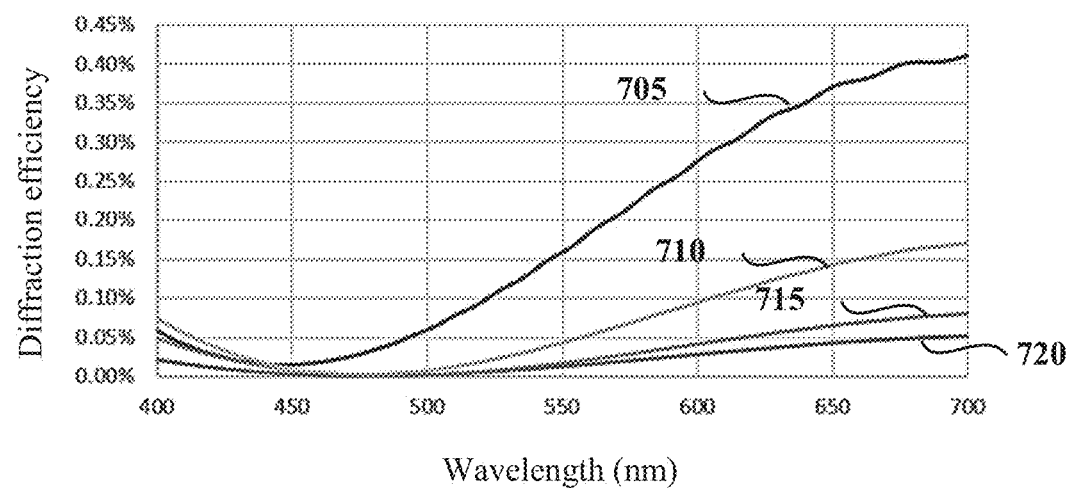
FIG. 7A illustrates diffraction efficiency of the $1^{st}$ transmitting order of PVH films with different birefringence.

FIG. 7A illustrates the diffraction efficiency of the +st transmitting order of the four PVH films. As shown in FIG. 7A, curves 705, 710, 715 and 720 represent the +1$^{st}$ transmitting order diffraction efficiency of the first to the fourth PVH films, respectively. As the four curves 705, 710, 715 and 720 show, over the visible spectrum from 400 nm to 700 nm, as the incident wavelength gradually increases, the +1$^{st}$ transmitting order diffraction efficiency of the fourth PVH films may first decrease then increase. In the wavelength range of about 450 nm to 500 nm, except the first PVH film, the second to the fourth PVH films may have negligible +1$^{st}$ transmitting order diffraction, where the diffraction efficiency is substantially zero.

Among the four PVH films, the fourth PVH film having a birefringence gradient in the thickness direction may have the smallest average +1$^{st}$ transmitting order diffraction efficiency as compared to the other three PVH films having uniform birefringence, and a maximum value of the $+1^{st}$ transmitting order diffraction efficiency of the fourth PVH film may be about 0.05% at a wavelength of 700 nm. Among the first to the third PVH films having uniform birefringence, the third PVH film having the lowest birefringence (0.07) may have the smallest average $+1^{st}$ transmitting order diffraction efficiency, the second PVH film having the medium birefringence (0.1) may have the medium average $+1^{st}$ transmitting order diffraction efficiency, and the first PVH film having the highest birefringence (0.15) may have the largest average $+1^{st}$ transmitting order diffraction efficiency. A maximum value of the +st transmitting order diffraction efficiency of the third to the first PVH films may be about 0.075%, 0.175% and 0.42% at a wavelength of 700 nm, respectively. That is, in the visible spectrum, the $+1^{st}$ transmitting order diffraction efficiency of the fourth PVH film having a birefringence gradient in the thickness direction may be significantly reduced as compared to the other three PVH films having uniform birefringence. The PVH film having a lower uniform birefringence may have a smaller $+1^{st}$ transmitting order diffraction efficiency. When the birefringence of the PVH film is substantially low, for example, lower than 0.1, the $+1^{st}$ transmitting order diffraction efficiency of the PVH film may also be substantially small.

Figure 7B:
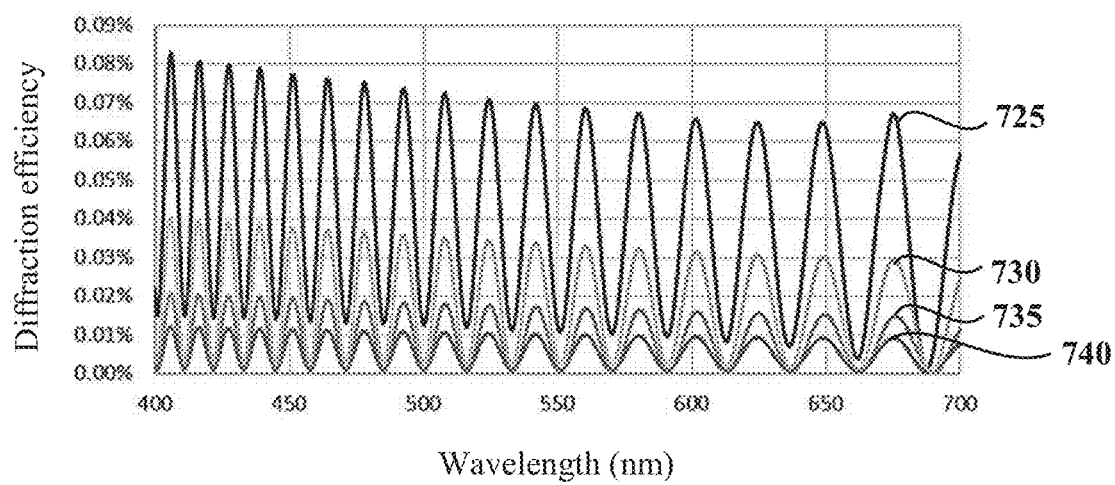
FIG. 7B illustrates diffraction efficiency of the $1^{st}$ reflecting order of PVH films with different birefringence.

FIG. 7B illustrates diffraction efficiency of the $+1^{st}$ reflecting order of the four PVH films. As shown in FIG. 7A, curves 725, 730, 735 and 740 represent the $+1^{st}$ reflecting order diffraction efficiency of the first to the fourth PVH films respectively. As the four curves 725, 730, 735 and 740 show, over the visible spectrum from 400 nm to 700 nm, among the four PVH films, the fourth PVH film having a birefringence gradient in the thickness direction may have the lowest average $+1^{st}$ reflecting order diffraction efficiency as compared to the other three PVH films having uniform birefringence, and a maximum value of the $+1^{st}$ reflecting order diffraction efficiency of the fourth PVH film may be about 0.012% at a wavelength of 400 nm. Among the first to the third PVH films having uniform birefringence, the third PVH film having the lowest birefringence (0.07) may have the smallest average $+1^{st}$ reflecting order diffraction efficiency, the second PVH film having the medium birefringence (0.1) may have the medium average $+1^{st}$ reflecting order diffraction efficiency, and the first PVH film having the highest birefringence (0.15) may have the largest average $+1^{st}$ reflecting order diffraction efficiency. A maximum value of the $+1^{st}$ reflecting order diffraction efficiency of the third to the first PVH films may be about 0.02%, 0.04% and 0.085% at a wavelength of 400 nm, respectively. That is, in the visible spectrum, the $+1^{st}$ reflecting order diffraction efficiency of the fourth PVH film having a birefringence gradient in the thickness direction may be significantly reduced as compared to the other three PVH films having uniform birefringence. The PVH film having a lower uniform birefringence may have a smaller $+1^{st}$ reflecting order diffraction efficiency. When the birefringence of the PVH film is substantially low, for example, lower than 0.1, the $+1^{st}$ reflecting order diffraction efficiency of the PVH film may also be substantially small.

Figure 8A:
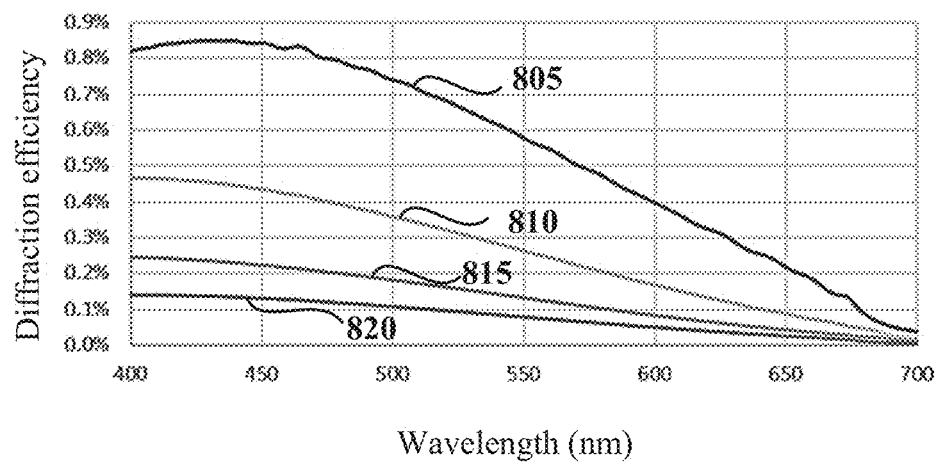
FIG. 8A illustrates diffraction efficiency of the $-1^{st}$ transmitting order of PVH films with different birefringence.

FIG. 8A illustrates diffraction efficiency of the $-1^{st}$ transmitting order of the four PVH films. As shown in FIG. 8A, curves 805, 810, 815 and 820 represent the $-1^{st}$ transmitting order diffraction efficiency of the first to the fourth PVH films respectively. As the four curves 805, 810, 815 and 820 show, over the visible spectrum from 400 nm to 700 nm, as the incident wavelength gradually increases, the $-1^{st}$ transmitting order diffraction efficiency of the second to the fourth PVH films may gradually decrease, while the $-1^{st}$ transmitting order diffraction efficiency of the first PVH film may first slightly increase to about 0.85% at a wavelength of 425 nm then decrease to about 0.05% at a wavelength of 700 nm.

Among the four PVH films, the fourth PVH film having a birefringence gradient in the thickness direction may have the smallest average $-1^{st}$ transmitting order diffraction efficiency as compared to the other three PVH films having uniform birefringence, and a maximum value of the $-1^{st}$ transmitting order diffraction efficiency of the fourth PVH film may be about 0.15% at a wavelength of 400 nm. Among the first to the third PVH films having the uniform birefringence, the third PVH film having the lowest birefringence (0.07) may have the smallest average $-1^{st}$ transmitting order diffraction efficiency, the second PVH film having the medium birefringence (0.1) may have the medium average $-1^{st}$ transmitting order diffraction efficiency, and the first PVH film having the highest birefringence (0.15) may have the largest average $-1^{st}$ transmitting order diffraction efficiency. A maximum value of the $-1^{st}$ transmitting order diffraction efficiency of the third to the first PVH films may be about 0.25% at a wavelength of 400 nm, 0.48% at a wavelength of 400 nm, and 0.85% at a wavelength of 425 nm, respectively. That is, in the visible spectrum, the $-1^{st}$ transmitting order diffraction efficiency of the fourth PVH film having a birefringence gradient in the thickness direction may be significantly reduced as compared to the other three PVH films having uniform birefringence. The PVH film having a lower uniform birefringence may have a smaller $-1^{st}$ transmitting order diffraction efficiency. When the birefringence of the PVH film is substantially low, for example, lower than 0.1, the $-1^{st}$ transmitting order diffraction efficiency of the PVH film may also be substantially small.

Figure 8B:
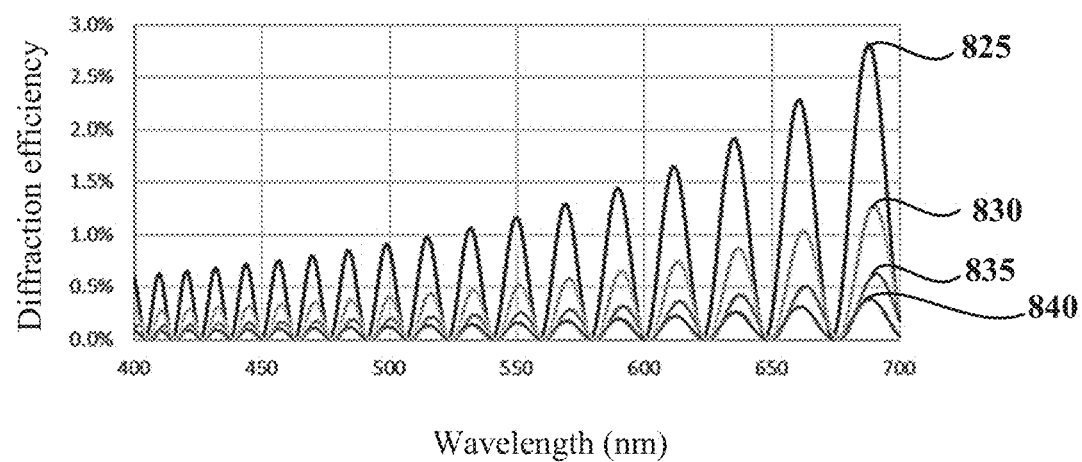
FIG. 8B illustrates diffraction efficiency of the $-1^{st}$ reflecting order of PVH films with different birefringence.

FIG. 8B illustrates diffraction efficiency of the $-1^{st}$ reflecting order of the four PVH films. As shown in FIG. 8A, curves 825, 830, 835 and 840 represent the $-1^{st}$ reflecting order diffraction efficiency of the first to the fourth PVH films respectively. As the four curves 825, 830, 835 and 840 show, over the visible spectrum from 400 nm to 700 nm, among the four PVH films, the fourth PVH film having a birefringence gradient in the thickness direction may have the smallest average $-1^{st}$ reflecting order diffraction efficiency as compared to the other three PVH films having uniform birefringence, and a maximum value of the $-1^{st}$ reflecting order diffraction efficiency of the fourth PVH film may be about 0.4% at a wavelength of about 688 nm. Among the first to the third PVH films having the uniform birefringence, the third PVH film having the lowest birefringence (0.07) may have the smallest average $-1^{st}$ reflecting order diffraction efficiency, the second PVH film having the medium birefringence (0.1) may have the medium average $-1^{st}$ reflecting order diffraction efficiency, and the first PVH film having the highest birefringence (0.15) may have the largest average $-1^{st}$ reflecting order diffraction efficiency. A maximum value of the $-1^{st}$ reflecting order diffraction efficiency of the third to the first PVH films may be about 0.7%, 1.3% and 2.8% at a wavelength of 688 nm, respectively. That is, in the visible spectrum, the $-1^{st}$ reflecting order diffraction efficiency of the fourth PVH film having a birefringence gradient in the thickness direction may be significantly reduced as compared to the other three PVH films having uniform birefringence. The PVH film having a lower uniform birefringence may have a smaller $-1^{st}$ reflecting order diffraction efficiency. When the birefringence of the PVH film is substantially low, for example, lower than 0.1, the $-1^{st}$ reflecting order diffraction efficiency of the PVH film may also be substantially small.

According to FIGS. 7A-7B and FIGS. 8A-8B, compared to the three PVH films having the uniform birefringence across the entire film, the PVH film having a birefringence gradient in the thickness direction may be able to significantly reduce the diffraction efficiency of the $\pm 1^{st}$ transmitting orders and $\pm 1^{st}$ reflecting orders for a normally incident light over the visible spectrum. That is, through configuring a PVH film having a birefringence gradient in the thickness direction, the rainbow effect caused by the diffractive structures in the PVH film may be significantly reduced. Accordingly, an eye-tracking combiner having the PVH film may be able to enhance the image quality of a see-through view in addition to guiding an IR light reflected from the eye to an optical sensor via diffraction.

In some embodiments, a PVH film having substantially low birefringence (e.g., lower than 0.1) may also be able to reduce the diffraction efficiency of the $\pm 1^{st}$ transmitting orders and $\pm 1^{st}$ reflecting orders for a normally incident light over the visible spectrum. Thus, the rainbow effect caused by the diffractive structures in the PVH film having substantially low birefringence may be reduced. A PVH film having lower birefringence may have smaller diffraction efficiency of the $\pm 1^{st}$ transmitting orders and $\pm 1^{st}$ reflecting orders than a PVH film having higher birefringence. That is, the PVH film having lower birefringence may have the suppressed rainbow effect as compared to the PVH film having higher birefringence. Accordingly, an eye-tracking combiner based on the PVH film having substantially low birefringence may be able to enhance the image quality of a see-through view in addition to guiding an IR light reflected from the eye to an optical sensor via diffraction.

Figure 9:
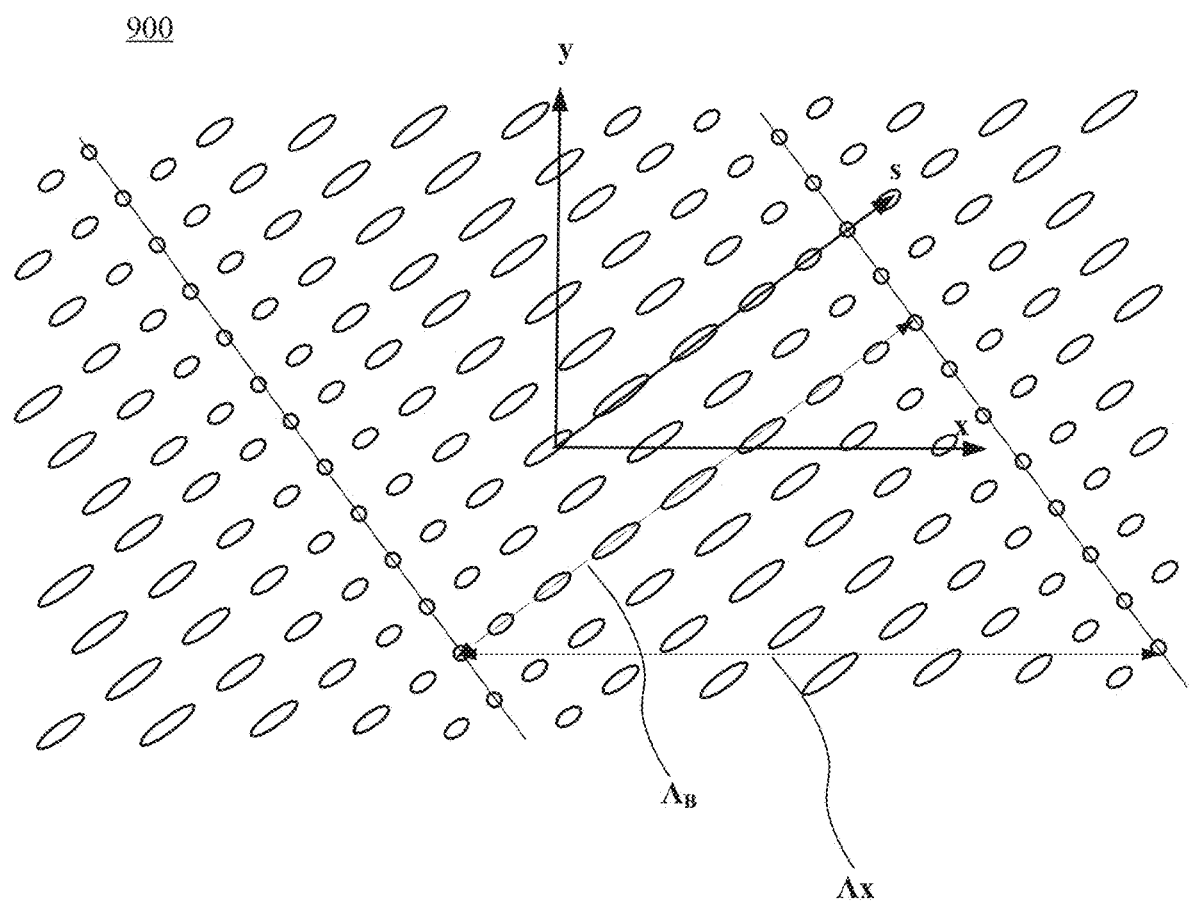
FIG. 9 illustrates a cross-sectional view of a PVH film included in a PVH grating, according to an embodiment of the disclosure.

FIG. 9 illustrates a cross-sectional view of a PVH film 900 included in a PVH grating, according to an embodiment of the disclosure. The PVH film 900 may be included in the grating in FIG. 1B and FIG. 2. FIG. 9 is a cross-sectional view of the PVH film 900 in the x-y plane. The optical function of a PVH film may be determined based on the manipulation of optic axes of the liquid crystalline molecules in the PVH film. Hereinafter, an orientation of the optic axis of a liquid crystalline molecule is also referred to as an orientation or alignment of the liquid crystalline molecule. The manipulation of optic axes of the liquid crystalline molecules in the PVH film is a 3D alignment of the liquid crystalline molecules. A PVH film consistent with the present disclosure can deflect a light via Bragg diffraction. As shown in FIG. 9, the PVH film 900 may include a plurality of M1 molecules. The M1 molecules may exhibit an in-plane molecular reorientation, which is changed in a linearly repetitive pattern from a center to an edge of the PVH film 900, with respect to a slanted axis, e.g., an s-axis direction. The distance between neighboring slanted lines is the Bragg period AB of the Bragg grating formed by the M1 molecules in the PVH film 900.

Figure 10A:
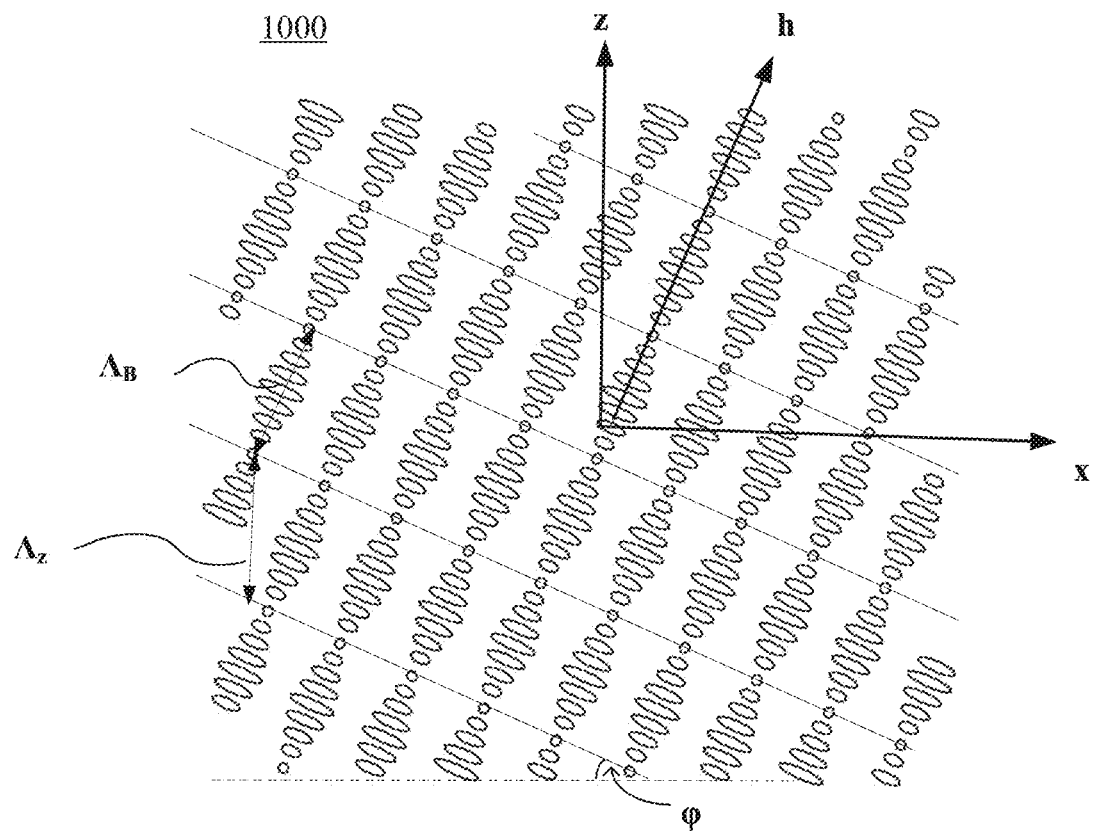
FIG. 10A illustrates a cross-sectional view of another PVH film included in a PVH grating, according to an embodiment of the disclosure.
Figure 10B:
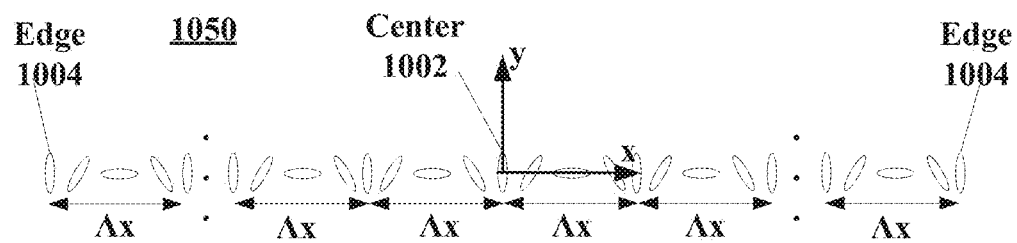
FIG. 10B illustrates a partial plane view of the PVH film shown in FIG. 10A in the x-y plane, according to an embodiment of the disclosure.

FIG. 10A illustrates a cross-sectional view of another PVH film 1000 included in a PVH grating, according to an embodiment of the disclosure; and FIG. 10B illustrates a partial plane view of the PVH film 1000 shown in FIG. 10A in the x-y plane, according to an embodiment of the disclosure. The PVH film 1000 may be configured with uniform birefringence and may be included in the grating shown in FIG. 1B and FIG. 2. FIG. 10A is a cross-sectional view of the PVH film 1000 in the x-z plane. FIG. 10B is a partial plane view 1050 of the PVH film 1000 in the x-y plane along the x-axis from a center region to an edge region of the PVH film 1000. The Bragg grating in the PVH film may be created by adding a chiral dopant to induce a helical twist along a certain direction, e.g., an h-axis direction shown in FIG. 10A. The helix twist may be either left-handed or right-handed and, accordingly, the PVH film may be referred to as a left-handed or a right-handed PVH film. In some embodiments, the PVH film may diffract circularly polarized light having a same handedness as the helix twist of the PVH film and transmit circularly polarized light having an orthogonal handedness.

As shown in FIG. 10A, the LC (or more broadly speaking, birefringent material because a reactive mesogen may also be employed) exhibits a helical structure with a period length of $\Lambda z$ (or one half of the pitch length p) along z-axis. The LC molecules may exhibit uniform molecular rotation with respect to a slanted helical axis, e.g., an h-axis direction. The period $\Lambda_z$ (or pitch length $\varphi=2\Lambda_z$) may be adjusted by controlling the helical twist power (HTP) and concentration of the chiral dopant. Further, as shown in FIG. 10B, an in-plane periodicity in the x-y plane is also introduced into the PVH film 1000 by, e.g., modifying the surface alignment of the PVH film 1000 to provide a rotation of the LC molecules in the x-y plane. The optic axis of the LC molecules may be changed in a linearly repetitive pattern from a center 1002 to an edge 1004 of the PVH film 1000, with a uniform pitch $\Lambda x$ along the x-axis. Such a scheme generates a series of slanted and periodical refractive index planes with a slanted angle $\varphi=\pm\arctan(\Lambda_z/\Lambda_x)$, as shown in FIG. 10A. The distance between neighboring slanted lines is the Bragg period AB of the Bragg grating formed by the LC molecules in the PVH film 1000. The Bragg period AB may depend on the z-axis period $\Lambda_z$ of the LC molecules and the slanted angle $\varphi$ of the Bragg planes with respect to a surface of the PVH film 1000. It should be noted that, the partial plane view of the PVH film 1000 in the x-y plane in FIG. OB is for illustrative purposes and is not intended to limit the scope of the present disclosure. In some embodiments, the LC molecules in the x-y plane may be configured with other orientation to realize a different optical function.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical device, comprising:
a grating including a birefringent material film configured with a birefringence gradient along a thickness direction of the birefringent material film, the birefringent material film being configured to diffract an infrared light and transmit a visible light with a diffraction efficiency that is less than a predetermined threshold.

2. The optical device according to claim 1, wherein the predetermined threshold is 0.5%.

3. The optical device according to claim 1, wherein the predetermined threshold is 0.1%.

4. The optical device according to claim 1, wherein the birefringent material film is a polarization volume hologram (PVH) film.

5. The optical device according to claim 4, wherein the PVH film is fabricated by a liquid crystalline polymer with a photo-cross-linkable mesogenic side group.

6. The optical device according to claim 5, wherein the liquid crystalline polymer with the photo-cross-linkable mesogenic side group includes polymethacrylate with 4-(4-methoxycinnamoyloxy) biphenyl (MCB) side groups having a chemical formula of

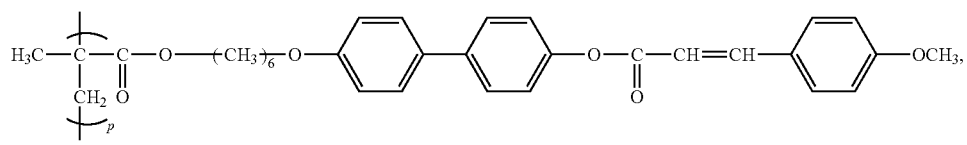

7. The optical device according to claim 6, wherein the birefringence gradient along the thickness direction of the PVH film is attainable by varying an exposure energy at different portions of a film of the polymethacrylate with 4-(4-methoxycinnamoyloxy) biphenyl (MCB) side groups.

8. The optical device according to claim 1, wherein along the thickness direction of the birefringent material film, a birefringence of the birefringent material film decreases from a predetermined portion to both end portions of the birefringent material film.

9. The optical device according to claim 8, wherein the predetermined portion of the birefringent material film is a center portion of the birefringent material film.

10. An eye-tracking system, comprising:
a light source configured to emit an infrared light to illuminate an eye;
a grating including a birefringent material film configured with a birefringence gradient along a thickness direction of the birefringent material film, the birefringent material film being configured to diffract the infrared light reflected from the eye and transmit a visible light with a diffraction efficiency that is less than a predetermined threshold; and
an optical sensor configured to receive the diffracted infrared light and generate an image of the eye based on the diffracted infrared light.

11. The eye-tracking system according to claim 10, wherein the predetermined threshold is 0.1%.

12. The eye-tracking system according to claim 10, wherein the birefringent material film is a polarization volume hologram (PVH) film.

13. The eye-tracking system according to claim 10, wherein along the thickness direction of the birefringent material film, a birefringence of the birefringent material film decreases from a predetermined portion to both end portions of the birefringent material film.

14. The eye-tracking system according to claim 13, wherein the predetermined portion of the birefringent material film is a center portion in the thickness direction.

* * * * *